United States Patent [19]

Gold et al.

[11] Patent Number: 4,814,439

[45] Date of Patent: Mar. 21, 1989

[54] CHEMICAL PROCESS FOR THE DENITRATION OF NITROCELLULOSE

[75] Inventors: Kenneth Gold, Hastings-On-Hudson, N.Y.; Bruce W. Brodman, Stroudsburg, Pa.

[73] Assignee: The United States of America as repesented by the Secretary of the Army, Washington, D.C.

[21] Appl. No.: 87,860

[22] Filed: Aug. 17, 1987

[51] Int. Cl.$^4$ .......................... B01D 3/34; C08B 5/04; C08B 5/12
[52] U.S. Cl. ........................................ 536/30; 536/37; 536/40
[58] Field of Search ....................... 526/30, 38, 40, 37

[56] References Cited

U.S. PATENT DOCUMENTS 3,546,149  12/1970  Fabian ................................... 536/40
4,082,617  4/1978  Portnoy et al. ...................... 536/38

Primary Examiner—John Kight
Assistant Examiner—Nathan M. Nutter
Attorney, Agent, or Firm—Robert P. Gibson; Edward Goldberg; Edward F. Costigan

[57] ABSTRACT

An improved chemical process is provided for the disposal of scrap nitrocellulose. The process involves the use of organic sulfhydryl-containing compounds to effect the nitrogen release from the nitrocellulose polymer. The nitrogen released by the application of this procedure is in the form of inorganic nitrite ions. The process is in effect a nucleophilic attack on the nitrocellulose, and is accompanied by cleavage or breakage of the cellulose chain.

5 Claims, No Drawings

CHEMICAL PROCESS FOR THE DENITRATION OF NITROCELLULOSE

The invention described herein may be manufactured, used and licensed by or for the Government without the payment of any royalties thereon.

FIELD OF INVENTION

In general, this invention relates to the degradation of nitrocellulose scrap. More particularly, this invention relates to an improved chemical process for use in the denitration of nitrocellulose.

BACKGROUND OF THE INVENTION

The disposal of scrap nitrocellulose is a problem which has existed since such propellants were first used in ammunition. The nitrocellulose scrap is Produced during manufacture of the munition, and when the propellant is finally demilitarized.

In the past, nitrocellulose has been disposed of by incineration, chemical processing, or a combination of chemical and biological degradation. However, burning results in the pollution of the air, and in many situations is illegal. The chemical processes utilize inorganic sulfides or hydrides which are hazardous. In the process of the prior art that utilizes both chemical and biological procedures, the scrap is hydrolyzed by a strong alkali and then the resulting mass is subjected to biological agents such as microbial entities. A need exists for a relatively safe procedure to dispose of scrap nitrocellulose which is effective and efficient in operation.

OBJECTS

It is therefore an object of this invention to provide an improved chemical process for the denitration of nitrocellulose.

Another object of this invention is to provide a process which is effective and efficient for the denitration of nitrocellulose.

A further object of this invention is to provide a process for the denitration of nitrocellulose which is safe and facile in use under acceptable range of operating conditions in a laboratory or plant.

Other objects and many of the attendant advantages of the process of the present invention will become obvious to those skilled in the art from a reading of the following detailed specification.

SUMMARY OF THE INVENTION

In this invention, an improved chemical process is provided for the disposal of scrap nitrocellulose. The process involves the use of organic sulfhydry-containing compounds to effect the nitrogen release from the nitrocellulose polymer. The nitrogen released by the application of this procedure is in the form of inorganic nitrite ions. The process is in effect a nucleophilic attack on the nitrocellulose, and is accompanied by cleavage or breakage of the cellulose chain.

DETAILED DESCRIPTION 2 grams of nitrocellulose ball propellant was added to 1 liter of an aqueous solution consisting of potassium phosphate buffer (0.1M), sodium ethylenediaminetetraacetic acid (2 mM), methyl viologen, (3 mM), and one of the following sulfhydryl- containing compounds; viz. 1-cysteine free base (0.05M), dithiothreitol, which is otherwise known as Cleland's reagent (10 mM), or its isomer dithioerythritol (10 mM). The pH of the reaction mixture should be about 7.5–7.8 with the overall pH range being 7.2–8.2. The solution was then brought to a boil under a fume hood. The solution turns blue on heating indicating that there are reducing conditions in the reaction vessel. This is because the methyl viologen dye used as an electron donor is blue in the reduced state and colorless when oxidized. The color of the solution changes during boiling and may appear greenish as the denitration proceeds. The water lost on boiling of the solution can be replenished by adding distilled water to the reaction vessel. Further, the effective temperature range over which the reaction proceeds is about 20° C. to about 110° C.

The denitration of the nitrocellulose was monitored by testing the supernatant for nitrite ions. This was done using standard colorimetric procedures. The analyses were performed as follows: One ml of the reaction mixture supernatant was removed to a borosilicate glass test tube and cooled to ambient temperature. After cooling the sample, one ml of acidified (HCl) sulfanilamide reagent was added directly to the test tube. The nitrite sulfanilamide complex which formed was then coupled to N-1-naphthyl ethylenediamine dihydrochloride by adding 1 ml of the aqueous solution of the latter to the test tube. The absorbance at 543 nm was converted to nitrite concentration by comparison with absorbance values of a standard curve prepared from known amounts of sodium nitrite. For the highest degree of accuracy the standard should be prepared in a buffer solution containing the sulfhydryl used for denitration because these compounds interferred in varying degrees with the nitrite analysis.

In separate experiments utilizing the procedure described above, the denitration reactions utilizing dithioerythritol and 1-cysteine were stopped after 2.5 and 3.0 hr, respectively, at which time the amount of nitrite released was calculated to be in excess of 100 mg. Alkaline hydrolysis of nitrocellulose by the buffer above only accounts for about 10 percent of the nitrite released compared with the complete reaction mixture.

When nitrocellulose ball propellant was treated in the above manner, there was a net weight loss. Analysis of the nitrocellulose remaining in the reaction vessel indicated that cleavage of the cellulosic skeleton had also occurred because the percentage of nitrogen remained unchanged.

The volume of the supernatant relative to the starting weight of the Propellant is an important consideration. The denitration was inhibited when carried out in small volumes (e.g., 20 ml), and this was found to be due to the buildup of nitrite ions in the supernatant. The simplest way to avoid the equilibrium problem at the higher temperatures tested was by dilution with distilled water.

There is latitude in fixing the upper concentration of 1-cysteine for use as described. Concentrations higher than 0.05M would probably be advantageous for reaction periods which are greater than 3 hr. However, if the concentration is lower than 0.05M, this would result in less nitrite being released in the same time interval. The optimum range of concentration was established in substantially smaller volumes and this was between 0.05 and 0.2M. The response curve for nitrite released vs concentration of 1-cysteine showed a plateau in this range i.e., between 0.05 and 0.2M.

In separate experiments, dithiothreitol showed an optimum denitration peak at a concentration of 10 mM, and by extrapolation, the 10 mM level of concentration 10 mM would be insufficient to accomplish the denitration objective. Further, concentrations greater than 10 mM either inhibited the reaction or interfered with the nitrite analysis.

Methyl viologen, the dye utilized in the above experiments, was found to be effective at 3 mM and was used at this concentration to conserve reagent.

Further experiments, utilizing the procedure heretofore described, were carried out in two different aqueous buffers and the results in each case were similar to those found with the above cited potassium phosphate buffer. The two different buffers utilized were sodium phosphate (0.1M) and tris (hydroxymethyl) aminomethane (0.05M).

In conclusion, the process of this invention as heretofore described was carried out in aqueous buffer. As is evident, this is inherently safer than burning nitrocellulose in air. Moreover, some of the reagents were recoverable and recyclable. For example, the amino acid 1-cystine upon oxidation is converted to 1-cystine. The limited solubility of the 1-cystine suggests a simple way to recover it, i.e., by filtration after cooling. Further, methyl viologen can be reduced after oxidation by the addition of reducing agent to the reaction vessel. As a result, the dye may be utilized again in further processing. The denitration of the nitrocellulose reaction described herein may also proceed in the presence of di-N-butyl phthalate deterrent and diphenylamine stabilizer, normally present as additives in small arms ammunition.

What is claimed is:

1. An improved process of denitrating nitrocellulose comprising:
   A. introducing in ratio about 2 gms. nitrocellulose into about 1 liter of an aqueous solution containing:
      1. a buffer
      2. a chelating agent,
      3. methyl viologen, and
      4. a sulfhydryl-containing compound selected from the group consisting of:
         a. 1-cysteine,
         b. dithiothreitol, and
         c. dithioerythritol,
   B. maintaining the pH of the solution between about 7.2 and 8.2, and
   C. reducing said nitrocellulose by boiling said aqueous solution for a period between about 2.5 and about 4 hours.

2. The process of claim 1 wherein the pH is maintained between about 7.5 and 7.8.

3. The process of claim 1 wherein said buffer is potassium phosphate of about (0.1M), and said chelating agent is sodium ethylenediaminetetracetic acid of about (2 mM) and said methyl viologen is about (3 mM).

4. The process of claim 1 wherein said buffer is sodium phosphate of about (0.1M) or tris (hydroxymethyl) aminomethane of about (0.05M).

5. The process of claim 1 wherein the concentration of the said 1-cysteine is about 0.5m to 0.2M, said dithiothreitol is about 10 mM, and said dithioerythritol is about 10 mM.

* * * * *